July 27, 1948.　　　H. L. BENNETT　　　2,446,039
STARTER TESTING APPARATUS
Filed Nov. 27, 1944　　　　　　　　　3 Sheets-Sheet 3
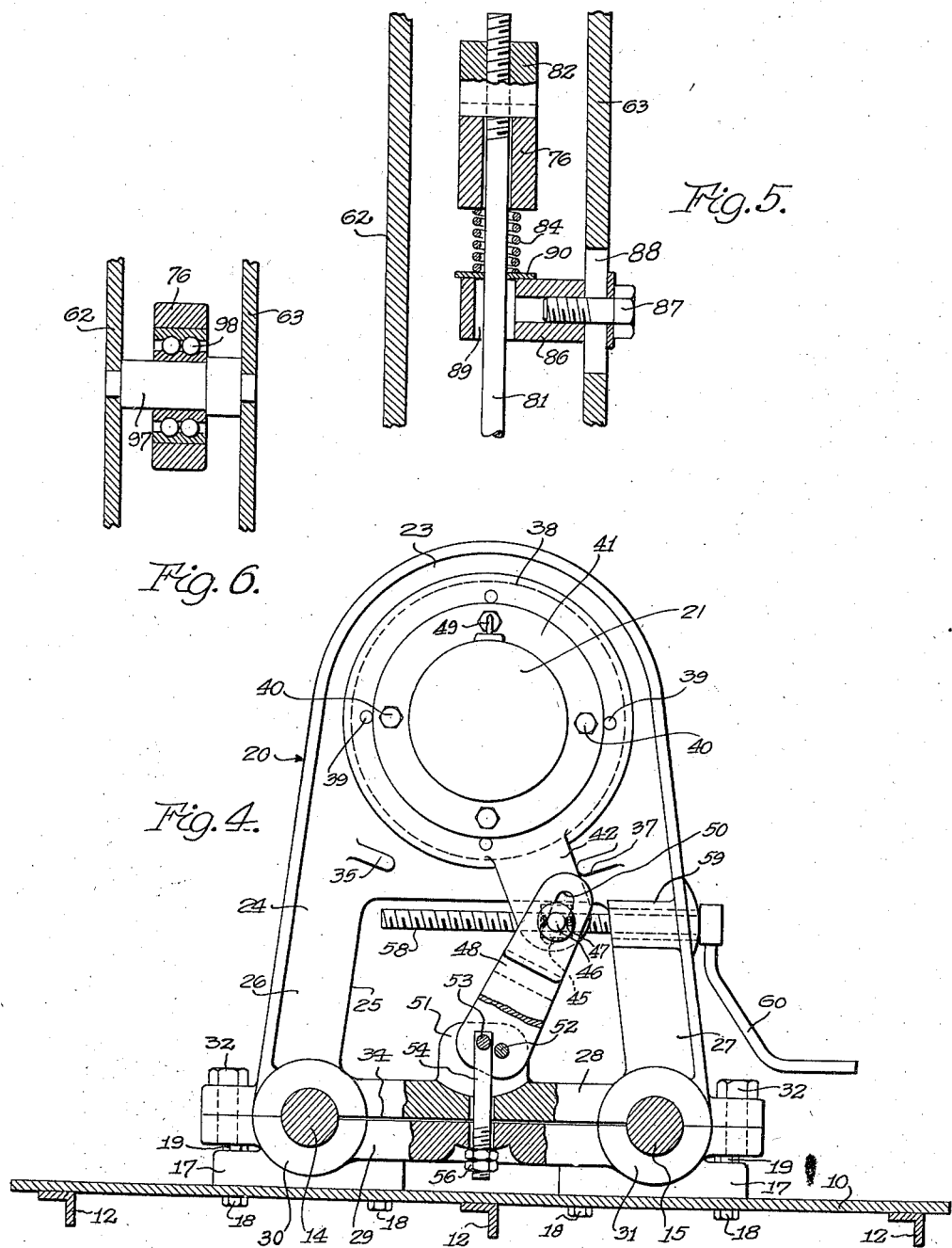
Inventor
Harold L. Bennett
By
A. E. Wilson
Attorney Patented July 27, 1948

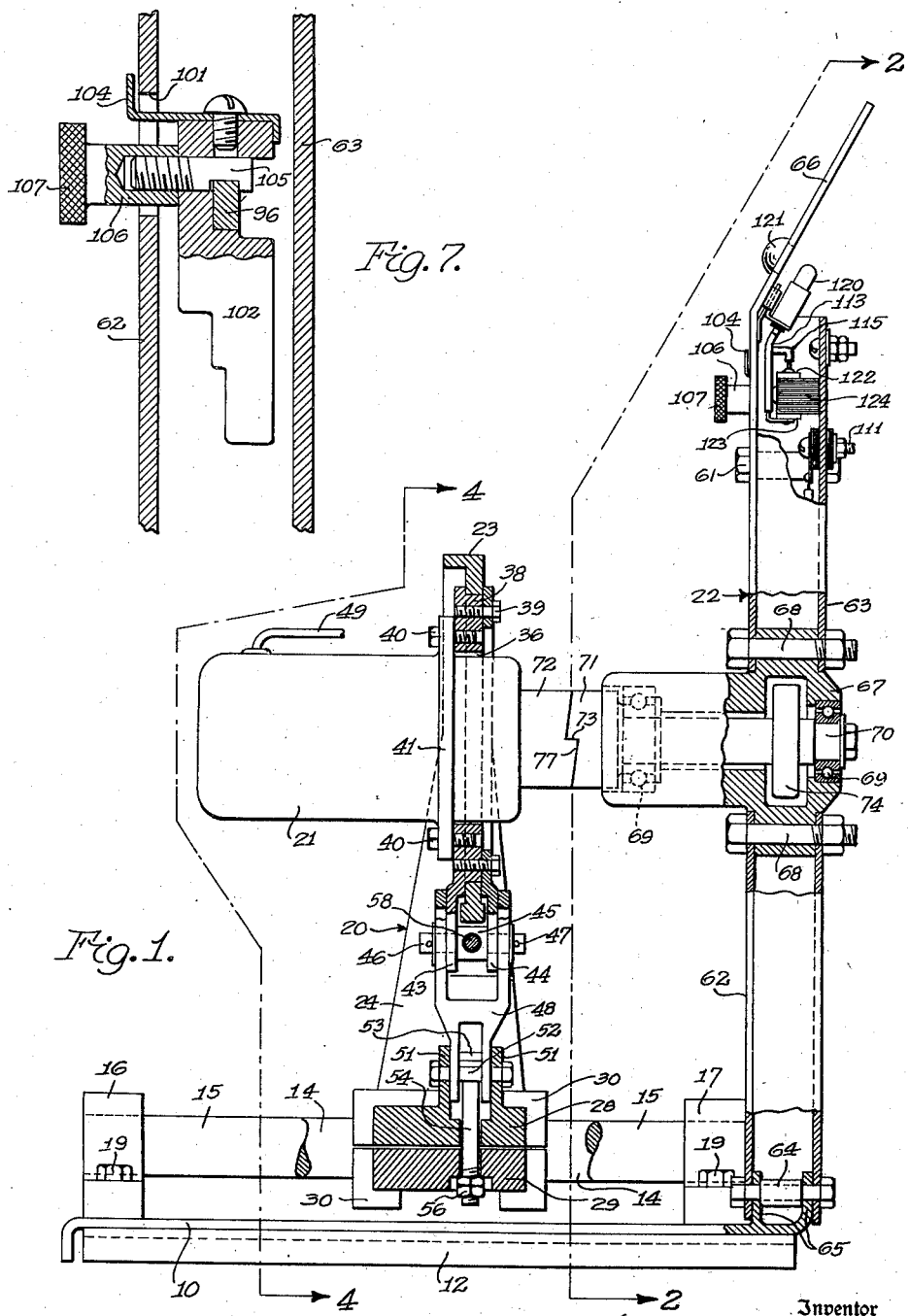

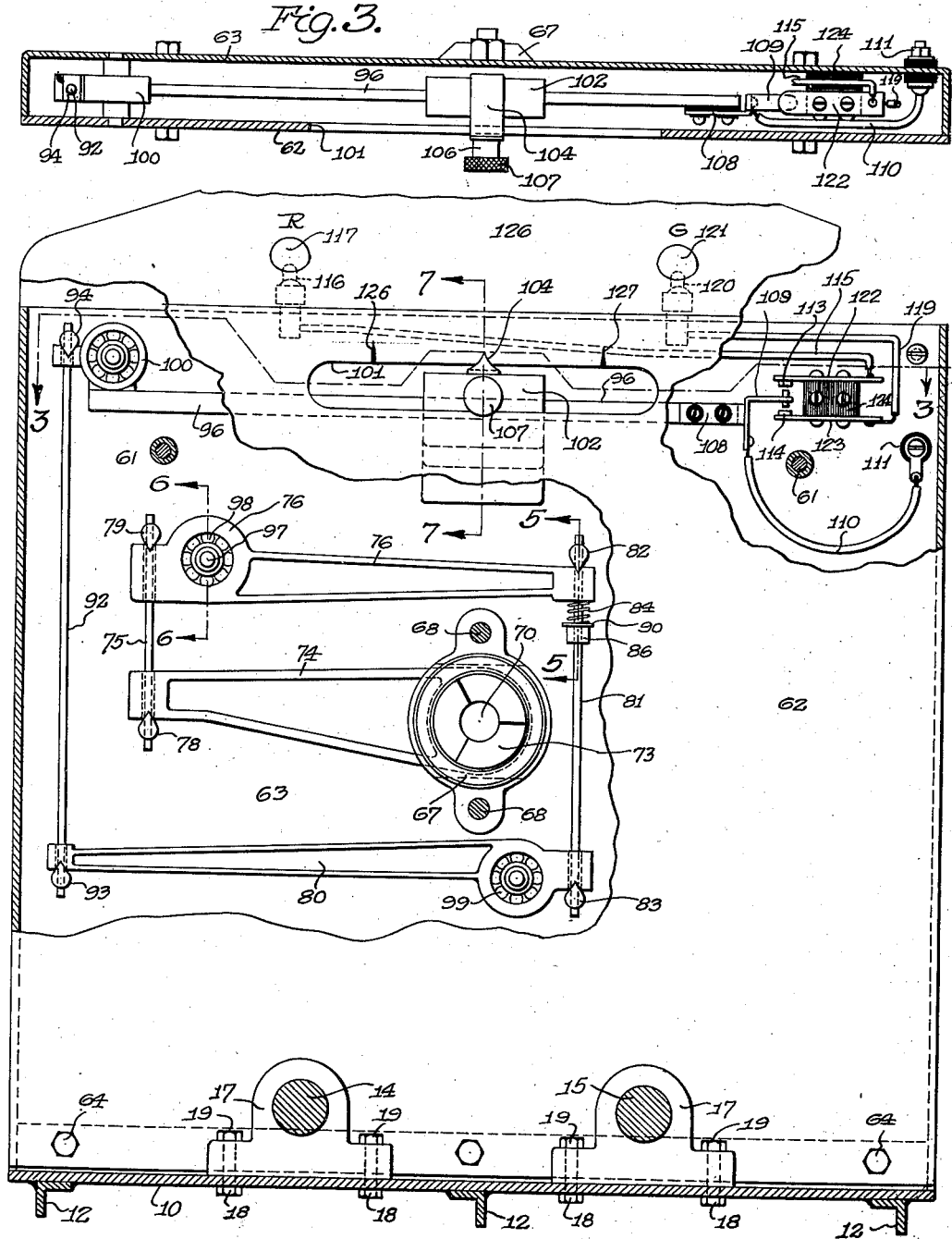

2,446,039

UNITED STATES PATENT OFFICE 2,446,039

STARTER TESTING APPARATUS

Harold L. Bennett, South Bend, Ind., assignor to Bennett-Feragen, Inc., South Bend, Ind., a corporation of Washington Application November 27, 1944, Serial No. 565,308

13 Claims. (Cl. 73—118)

This invention relates to testing apparatus, and more particularly to apparatus for measuring the torque developed by an airplane engine starter.

The starter to be tested by the present apparatus comprises an electric motor supplied with current from storage batteries or other source and designed to be connected through a clutch with the crank shaft of the airplane engine. It is necessary that the electric motor of such a starter develop sufficient torque to rotate the airplane engine when the same is cold. It is furthermore necessary that the clutch be so adjusted that it will transmit sufficient torque to rotate the engine, while releasing or slipping upon the imposition of any overload, such as would occur if the engine were incapacitated because of a broken timing gear, or because of the presence of liquid in the cylinders, or for any other reason. Under any of the circumstances just mentioned, it is necessary that the clutch be so adjusted that it will slip and thus prevent excessive torque from being transmitted to the engine crank shaft, which would cause damage to the engine.

The present invention aims to provide a testing apparatus which will measure and register the maximum torque delivered by the tester, and thus enable adjustments to be made to bring the maximum torque within certain tolerance limits. If the maximum torque delivered by the starter is too great, the clutch may be adjusted to decrease the maximum torque transmissible thereby. If the maximum torque is too low, the fault may be either with the electric motor or its batteries, or with the clutch, and the remedy may consist in repairing or replacing the motor, increasing the current supplied to the motor, or in tightening the clutch to enable it to transmit a higher maximum torque.

An object of the present invention is to provide a testing apparatus suitable for use with airplane engine starters, and which shall be simple to operate and economical to manufacture.

A further object of the invention is to provide a starter tester wherein friction of the moving parts is minimized by the use of knife-edge bearings and other frictionless types of bearings.

A further object of the invention consists in the provision of a series of levers connected to each other in series, thereby eliminating the use of excessively long levers and making possible a compact arrangement of the device.

A further object of the invention is to provide a starter testing apparatus which is so simple in operation that it may be operated by one having no special training, the operation being reduced to a series of simple mechanical steps.

A further object of the invention is to provide a starter testing apparatus wherein a plurality of starters may be successively mounted in the apparatus, tested, and dismounted, all with a minimum of effort and time on the part of the operator.

A further object of the invention is to provide improved torque measuring apparatus having indicating means energized when the torque being measured exceeds or falls below a predetermined range.

Further objects and advantages of the invention will be apparent from the following detailed description considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Fig. 1 is a side elevation, partly in section, of a starter tester embodying the present invention;

Fig. 2 is a front elevation of the scale beams and associated mechanism, corresponding to a view taken on the line 2—2 of Fig. 1;

Fig. 3 is a horizontal sectional view of the same, taken on the line 3—3 of Fig. 2;

Fig. 4 is a front elevation of the starter stand, corresponding to a view taken on the line 4—4 of Fig. 1, but with parts broken away to reveal the interior construction;

Fig. 5 is a sectional detail view taken on the line 5—5 of Fig. 2;

Fig. 6 is a detail view taken on the line 6—6 of Fig. 2; and

Fig. 7 is a further sectional detail view taken on the line 7—7 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be undertsood that the phraseology or terminology employed herein is for the purpose of description and not of limitation.

Referring to the drawings, the testing apparatus comprises a platform 10 mounted upon supports 12 of any suitable type. The platform 10 supports a pair of horizontal slide rods or rails 14, 15 by means of brackets 16, 17 which embrace the respective ends of the rods and are secured to the platform by means of bolts 18, 19. Slidably mounted on the rods 14, 15 is a supporting stand 20 for the starter 21 to be tested, while the torque registering apparatus, indicated generally at 22 in Figure 1, is fixedly mounted at the rear of the platform 10.

The stand 20 comprises a rigid frame 24 having an opening 25 in the lower portion thereof and having spaced legs 26, 27, connected by a crosspiece 28. The legs terminate in semi-cylindrical bearing sleeves which, in conjunction with similar sleeves formed on a lower cross-piece 29 at the base of the frame, form the slide bearings 30, 31. The cross-piece 29 is secured to the frame 24 by means of clamping bolts 32. The arrangement is such that the bearings 30, 31 are normally slidable upon the rods 14, 15, but a slight space 34 is provided between the cross-piece 28 and the cross-piece 29, both of which have sufficient flexibility to permit them to be forced into proximity with each other, by means described hereinafter, so as to tighten the bearings 30, 31 and thereby prevent sliding movement thereof upon the rods 14, 15.

The upper portion 23 of frame 24 is provided with a circular aperture 36 (Fig. 1), within which is rotatably mounted an annular bracket 38, which may be built up of concentric annular plates, secured together by means of bolts 39. The bracket 38 is provided with spaced threaded holes for the reception of stud bolts 40 which pass through the flange 41 of the starter 21, whereby the starter may be securely but rotatably mounted upon the stand for testing. The starter is connected to a source of electrical energy through lead wires 49.

At its lower portion, the bracket 38 is provided with a downwardly projecting arm 42, formed with spaced projections 43, 44 separated by a spacing block 45 having pivot pins 46, 47 extending forwardly and rearwardly thereof. The arm 42 is movable between fixed stops 35, 37 formed on the forward surface of frame 24. A locking lever 48 is bifurcated at its upper end and is provided with slots 50 which receive the pivot pins 46, 47. The lower end of lever 48 is likewise bifurcated and is pivoted to spaced lugs 51 upon cross-piece 28 by means of a pivot pin 52. Spaced laterally from pin 52 is a second pin 53 by which a locking bolt 54 is pivotally secured to the locking lever. The bolt 54 extends downwardly through central apertures in cross-pieces 28, 29, and terminates in an adjustable head 56 positioned in a recess in the lower surface of cross-piece 29. It will be seen that upon rotation of locking lever 48 in the clockwise direction as viewed in Fig. 4, the cross-pieces 28, 29 will be flexed toward each other, causing the bearings 30, 31 to clamp the slide rods 14, 15 and prevent movement therebetween, thereby locking the stand 20 against forward and rearward movement relative to the slide rods.

The apparatus for actuating locking lever 48 comprises a horizontal threaded rod 58 having an unthreaded portion journaled in a bearing 59 in leg 27, and manually actuated by a crank 60. The rod 58 threadedly engages in an aperture in block 45, so that upon rotation of the crank 60 the lever 48 may be moved in the clockwise or counterclockwise direction, while the bracket 38 and starter 21 will be rotated in the opposite direction. Rotation of the lever 60 in the counterclockwise direction as viewed in Fig. 1 will therefore release the stand 20 to permit it to be slid forwardly of rods 14, 15, and will also rotate the starter 21 in the clockwise direction to facilitate its disengagement from the torque registering apparatus.

The registering apparatus comprises a vertical frame made up of front and rear plates 62, 63, secured by any convenient means such as bolts 64 to spaced flanges 65 formed upon the platform 10, and secured together in spaced relation by means by spacing bolts 61. The front plate 62 forms an instrument panel, and its upper portion 66 is backwardly inclined, as shown, to facilitate the reading of the indicators located thereon. Positioned centrally of the plates 62, 63 is a bearing block 67, held in position by bolts 68, and provided with anti-friction bearings 69 forming a journal for the tester shaft 70.

Shaft 70 is provided at its forward end with an enlarged portion 71, which is provided with radial dogs 73 to permit it to engage the similarly formed shaft 72 of the starter. The built-in clutch which forms a part of the starter 21 is not specifically shown in the drawings, but is housed in the starter casing and connects the electric motor at the forward portion of the starter with the shaft 72, in the known manner. The shaft 72 is provided with radial dogs 77 which are shaped and adapted to engage the correspondingly shaped end of a shaft connected directly or indirectly to the crank shaft of an airplane motor. The portion 71 of the tester shaft 70 must therefore be correspondingly formed in order that it may be engaged by shaft 72 and rotated thereby in the counterclockwise direction.

Fixed to shaft 70 is a scale beam 74 which extends horizontally therefrom and has its free end connected by a rod 75 with the short end of a second scale beam 76. The rod 75 is connected to the beams 74 and 76 by means of dogs 78, 79 which have a knife-edge engagement with correspondingly formed notches in the beams.

The free end of beam 76 is connected to the short end of a third scale beam 80 by means of a rod 81, engaging the beams in knife edge relation through dogs 82, 83, in a manner similar to that described in connection with rod 75. For purposes of adjusting the registering apparatus, the dog 82 is made adjustable along the rod 81 as best seen in Figure 5; also a compression spring 84 is mounted beneath the free end of beam 76 encircling the rod 81, while a stud 86 is adjustably mounted beneath the spring by means of a bolt 87 projecting through a vertical slot 88 in plate 63 and threaded in a horizontal bore in the stud. The forward end of the stud is provided with a vertical aperture 89 which freely receives the rod 81 is slidable relation, and supports a washer 90 thereon which engages the spring 84. By this means, the pressure of spring 84 tending to rotate beam 76 in the counterclockwise direction may be varied at will. The manner in which this apparatus is utilized to adjust the torque registering apparatus is described hereinafter.

The free end of beam 80 is connected by means of a rod 92 and dogs 93, 94 to the short end of the registering beam 96. The beams 76, 80 and 96 are pivoted by means of frictionless bearings of the type shown in Fig. 6, comprising a fixed stud 97 extending between the forward and rearward plates, and provided with frictionless bearings 98 of any suitable known construction. The corresponding bearings for levers 80 and 96 are indicated at 99 and 100. It will be noted that the center of gravity of beam 96 lies below and to the right of its bearing 100, so that mechanical energy is required to rotate it in the counterclockwise direction.

Adjacent the beam 96, the front plate 62 is provided with a horizontal aperture 101. A weight 102 is slidably mounted upon the beam 96, and carries an indicator 104 secured thereto, which projects through the aperture 101 into overlying relation with respect to the upper edge of the aperture, which may be calibrated in any suitable units, such as foot-pounds. In the illustrated embodiment, a calibration mark 126 corresponds to the lower limit of tolerance, while a second calibration mark 127 corresponds to the upper limit. In order to secure the weight 102 slidably on the beam 96, a bolt 105 (Fig. 7) extends through the upper portion of weight 102 and has a notch at its lower periphery which slidably engages the beam 96 and locks the bolt against rotation. The forward end of the bolt is threaded and is engaged by a threaded sleeve 106 having a knurled head 107 which may be rotated to bring the sleeve into frictional engagement with the forward surface of weight 102 to lock the weight in position. When rotated in the opposite direction, the sleeve 106 releases the weight for sliding movement, while the head 107 forms a convenient handle for use in sliding the weight.

A free end of beam 96 has mounted thereon by means of a bracket 108, a movable switch element 109, the free end of which is provided with oppositely disposed electrical contacts. The other end of element 109 is connected by means of a flexible conductor 110 to a source of electrical current indicated by the binding post 111. Spaced fixed contacts 113, 114 are positioned above and below the contact points of the switch element 109 in such relation that in the operation of the apparatus the element 109 will, upon the application of an excessive amount of torque to shaft 70, come into contact with contact 113, whereas if the torque applied to shaft 70 is excessively low, the element 109 will contact the contact 114. Within an appreciable range of torque values the element 109 will remain at an intermediate position, such as that shown in Fig. 2, wherein it contacts neither of the contacts 113, 114.

Contact 113 is connected, through a metallic strip 122 and a lead 115, to a pilot lamp 116 seated immediately back of an aperture in the portion 66 of plate 62. The aperture contains a lens 117, which permits the light from lamp 116 to pass therethrough, and which may be of a distinctive color, such as red, to signify that excess torque is being registered by the machine.

The contact 114 is connected, through a metallic strip 123 and a lead 119, to a second pilot lamp 120 which is similarly located adjacent an aperture in the panel, and contains a lens 121, which may be of a color such as green, to indicate that the torque being registered is below standard. Strips 122, 123 are secured by an insulating block 124 to the plate 63, and the lamps 116, 120 are grounded in any suitable manner, so that upon contact of the switch element 109 with either of contacts 113, 114, a circuit will be completed through one or the other of the lamps. If desired, the flow of current to the registering apparatus through conductor 110 and to the starter through lead wires 49 may be controlled by a single switch (not shown).

To adjust the testing apparatus for operation, a predetermined torque is applied to the tester shaft 70. The sleeve 106 is then loosened, and the weight 102 moved to the left along the beam 96 until indicator 104 registers with the calibration mark 126, corresponding to the lower tolerance limit of the torque developed by the starter to be tested. The switch element 109 should then position itself lightly in contact with contact 113. Similarly, when the indicator 104 is moved into registry with the calibration mark 127, corresponding to the upper tolerance limit of the torque to be measured, the element 109 should position itself lightly in contact with contact 114. These conditions having been brought about by suitable adjustment of dog 82 and stud 86, the weight 102 is moved to a position midway between marks 126 and 127, as shown in Fig. 3, in which position the element 109 will position itself midway between the contacts 113 and 114.

In order to prepare the apparatus for testing a starter, the crank 60 is rotated in the counterclockwise direction as viewed in Fig. 1 until the arm 42 is brought into contact with stop 35. This relieves the tension on the locking bolt 54, and permits the stand 20 to be moved forwardly out of operative relation to the registering apparatus 22.

A starter to be tested is then mounted upon the stand by means of the bolts 40, and the stand is moved rearwardly along rods 14, 15 until the shaft 72 of the starter engages portion 71 of the shaft 70. The operator then rotates the crank 60 in the clockwise direction as viewed in Fig. 1, while continuing to press the stand rearwardly, until the arm 42 is brought into contact with, or into proximity to, the stop 37, thus rotating the starter through an angle of approximately 40 degrees. At this point, the locking lever 48 will have brought cross-pieces 28, 29 into engagement, thereby locking the stand against sliding movement, while at the same time the dogs 77 upon shaft 72 and dogs 73 upon shaft 70 will have been brought into registering engagement; or if it happens that they were in registering engagement at the beginning of the operation, the only result will be that the shaft 72 will remain stationary while the remainder of the starter is being rotated.

The operator will then cause the electric motor of the starter 21 to be energized through lead wires 49, and the motor will then act, through the clutch, upon shaft 72, exerting torque upon the shaft 70, which torque will tend to rotate each of the beams 74, 76, 80 and 96 in the counterclockwise direction as viewed in Fig. 2. If the torque is below the tolerance limits set for the starter, the movable switch element 109 will remain in contact with the contact 114, with the result that current will flow through conductor 110, element 109, contact 114, strip 123, and lead 119 to lamp 120, causing a green light to appear at 121. If, on the other hand, the torque transmitted to shaft 70 is in excess of the tolerance limits for the starter, the switch element 109 will move into contact with the contact 113, and current will flow through the conductor 110, element 109, contact 113, strip 122 and lead 115 to lamp 116, causing a red light to appear at 117. If no light appears on the dial, that fact apprises the operator that the torque is within the tolerance limits. The operator then makes a notation of the result of the test, disconnects the current to lead wires 49, and rotates the crank 60 in the counterclockwise direction as viewed in Fig. 1, thereby disengaging the dogs 73 and 77 and releasing the stand 20 to permit it to be moved forwardly. The bolts 40 are thereupon removed, the tested starter removed from the stand, a new starter mounted upon the stand, and the operation is repeated.

Although the invention has been described with reference to a particular embodiment thereof, it is not limited to such embodiment, but may be embodied in other forms within the limits of the skill of artisans in this art. The invention is therefore not to be considered as limited except in accordance with the terms of the following claims.

I claim:

1. Apparatus for testing the torque developed by an airplane engine starter having a shaft adapted to releasably engage and rotate an element associated with the engine, comprising a torque indicator having a member shaped to be releasably engaged by said shaft, means supporting said starter for slidable movement into and out of operative relation to said member, manually operable means for rotating said starter and shaft to bring the shaft into operative engagement with said member, and releasable means for locking said supporting means against slidable movement.

2. In apparatus for measuring the torque developed by an engine starter having a shaft adapted to releasably engage an element associated with the engine, a torque indicator having a member shaped to be releasably engaged by said shaft, means for supporting said starter for movement into and out of operative relation to said member, manually operable means for rotating said starter and shaft to index the shaft relative to said member, and means for locking said supporting means against said movement.

3. Apparatus for testing the torque developed by an engine starter having a shaft adapted to releasably engage and rotate an element associated with the engine, comprising a torque indicator having a member shaped to be releasably engaged by said shaft to receive torque therefrom, means supporting said starter for rotation about its own axis and for sliding movement into and out of operative relation to said member, means for locking the supporting means against sliding movement, and common manual means for rotating said starter and shaft to index the shaft relative to said member and for actuating said locking means.

4. Apparatus for measuring the torque developed by an engine starter having a shaft adapted to releasably engage an element associated with the engine, comprising a torque indicator including a coupling member shaped to be releasably engaged by said shaft, a stand having a rotatable member adapted to support said starter for movement about its own axis, means for supporting said stand for slidable movement to move said starter into and out of operative relation to said coupling member, means for locking said supporting means against such slidable movement, and means for rotating said rotatable member to index the starter shaft relative to said coupling member, said rotating means being simultaneously operative to actuate said locking means.

5. Apparatus for measuring the torque developed by an engine starter having a shaft, comprising a torque indicator having a coupling member adapted to be engaged by said shaft and having a scale beam operatively connected to said coupling member, electric indicating means associated with said indicator and energized only when the torque transmitted to the indicator exceeds or falls below a predetermined range, means supporting said starter for rotation about its own axis and for slidable movement into and out of operative relation to said coupling member, means for locking said supporting means against such slidable movement, and means for rotating said starter to index the same relative to said coupling member, said rotating means being simultaneously operative to actuate said locking means.

6. Apparatus for measuring the torque developed by an electrical engine starter, comprising a torque indicator having a coupling member adapted to be engaged by said starter, and means for supporting said starter for movement into and out of operative relation to said coupling member, said means comprising spaced horizontal slide rails, and a stand slidable on said slide rails and having flexible members embracing the same, means for flexing said flexible members to cause them to grip the slide rails and prevent movement of the stand relative thereto, said stand including a starter receiving member rotatably supported by the stand in alignment with said coupling member, and means for simultaneously rotating said starter receiving member and actuating said flexing means.

7. Apparatus for measuring the torque developed by an engine starter having an axial shaft, comprising a pair of spaced horizontal rails, a starter support movable along said rails, rotatable means carried by said support for supporting a starter for angular rotation about its own axis, torque indicating means engageable by the starter shaft when said support is in a predetermined angular position, and means simultaneously operative to rotate said rotatable means and to lock said support against movement relative to said rails.

8. Apparatus for measuring the torque developed by an engine starter having an axial shaft, comprising a torque indicator adapted to be engaged by said shaft and to register the torque transmitted thereby, a stand for the starter, a rail supporting the stand for movement thereof into and out of operative relation to the torque indicator, a rotatable member on said stand adapted to receive the starter for angular rotation about its own axis, flexible clamping means associated with the stand and engageable with said rail to prevent movement of the stand relative to the rail, and manually operable means for rotating said rotatable member, for restraining the same against rotation, and for actuating said flexible means.

9. In apparatus for measuring the torque developed by an engine starter having a shaft adapted to releasably engage an element associated with the engine, a torque indicator having a member shaped to be releasably engaged by said shaft, means for supporting said starter for movement into and out of operative relation to said member, manually operable means for rotating said starter and shaft to index the shaft relative to said member, means for locking said supporting means against said movement, and common means for actuating said rotating means and said locking means.

10. Apparatus for measuring the torque developed by a motor having a shaft, comprising a coupling member shaped to be engaged by said shaft, a torque indicator connected to said coupling member to register the torque exerted thereon by said motor, means for supporting the motor for rotation about its own axis and for slidable movement into and out of operative engagement with said coupling member, and manual means for rotating said motor to index the same relative to said coupling member, said manual means being operative to simultaneously lock said supporting means to prevent said slidable and rotary movements.

11. The invention defined in claim 10, wherein the supporting means includes a slide and spaced flexible members forming a bearing slidable thereon, and the manual means includes means for deforming said flexible members into non-slidable relation to the slide.

12. The invention defined in claim 10, wherein the supporting means includes a pair of parallel rails and spaced flexible members forming bearings slidable on said rails, and the manual means includes means for preventing rotation of the starter about its own axis and means for deforming said flexible members to clamp said bearings into non-slidable relation to said rails.

13. Apparatus for measuring the torque developed by a motor having a shaft, comprising a coupling member adapted to have actuating engagement with the shaft, a torque indicator associated with said coupling member to register the torque exerted thereon by the shaft, a stand, flexible bearing members for the stand mounting it for sliding movement into and out of operative engagement with said coupling member, said stand having a rotary receiving member for supporting the motor for rotation about its own axis, a screw engaging the receiving member for rotating the motor to index said shaft relative to said coupling member, said screw being operative to deform said flexible bearing members to clamp the bearings into inoperative condition.

HAROLD L. BENNETT.

REFERENCES CITED

The following references are of record in the file of this patent:

UNITED STATES PATENTS

| Number | Name | Date |
|---|---|---|
| 1,205,448 | Halbleib | Nov. 21, 1916 |
| 1,310,396 | Haskins | July 15, 1919 |
| 1,424,357 | Hem | Aug. 1, 1922 |
| 1,685,789 | Thomas | Oct. 2, 1928 |
| 1,872,420 | Iongh | Aug. 16, 1932 |
| 2,279,698 | Weckerly | Apr. 14, 1942 |
| 2,355,254 | Yeasting | Aug. 8, 1944 |
| 2,381,549 | Mabery | Aug. 7, 1945 |
| 2,401,907 | Cahill et al. | June 11, 1946 |
| 2,405,060 | Scofield | June 30, 1946 |

FOREIGN PATENTS

| Number | Country | Date |
|---|---|---|
| 522,556 | Great Britain | June 20, 1940 |